United States Patent
Jackson

(10) Patent No.: US 10,814,668 B2
(45) Date of Patent: Oct. 27, 2020

(54) KIOSK AND METHOD FOR MAKING PUZZLE TAGS

(71) Applicant: Jeffery James Jackson, Mobile, AL (US)

(72) Inventor: Jeffery James Jackson, Mobile, AL (US)

(*) Notice: Subject to any disclaimer, the term of this patent is extended or adjusted under 35 U.S.C. 154(b) by 687 days.

(21) Appl. No.: 15/346,436

(22) Filed: Nov. 8, 2016

(65) Prior Publication Data

US 2018/0130038 A1    May 10, 2018

(51) Int. Cl.
| | |
|---|---|
| G06Q 20/18 | (2012.01) |
| B44C 1/22 | (2006.01) |
| G06Q 30/06 | (2012.01) |
| G05B 19/4093 | (2006.01) |

(52) U.S. Cl.
CPC .......... B44C 1/225 (2013.01); G05B 19/4093 (2013.01); G06Q 30/0621 (2013.01); *B44C 1/228* (2013.01); *G05B 2219/36199* (2013.01); *G05B 2219/36274* (2013.01); *Y02P 80/40* (2015.11); *Y02P 90/02* (2015.11)

(58) Field of Classification Search
CPC ................ B44C 1/225; G05B 19/4093; G05B 2219/36274; G05B 2219/36199; G06Q 30/0621; Y02P 80/40; Y02P 90/265
USPC ............ 219/121.67, 121.68, 121.71, 121.72, 219/121.73, 121.78, 124.21, 124.22
See application file for complete search history.

(56) References Cited

U.S. PATENT DOCUMENTS

| | | | | |
|---|---|---|---|---|
| 4,372,538 A | * | 2/1983 | Balfanz | B23K 7/002 198/468.5 |
| 4,393,410 A | * | 7/1983 | Ridge | H04N 1/195 358/488 |
| 4,466,069 A | * | 8/1984 | Balfanz | B23K 7/002 266/58 |
| 4,583,181 A | * | 4/1986 | Gerber | A41H 43/00 700/143 |
| 4,629,858 A | * | 12/1986 | Kyle | B23K 26/0853 219/121.69 |
| 4,791,267 A | * | 12/1988 | Yokoyama | H01J 9/00 219/121.69 |
| 4,844,947 A | * | 7/1989 | Kasner | B05D 5/06 427/510 |

(Continued)

OTHER PUBLICATIONS (YouTube) Screen captures from YouTube video clip entitled "Laser systems for label cut, Embroidered, Woven ,Printing label," 1 page, uploaded on May 23, 2013 by user "GBOS Laser". Retrieved from Internet: <https://www.youtube.com/watch?v=a3aYy9hOUYA>.*

(Continued)

*Primary Examiner* — Jimmy Chou
(74) *Attorney, Agent, or Firm* — AdamsIP, LLC; J. Hunter Adams; Stephen Thompson

(57) ABSTRACT

A device and method for making puzzle tags are disclosed. The device is a kiosk that utilizes a cutting instrument to cut tag plates, based on cutting pattern selection input provided by a customer, into a series of pieces that form a first puzzle tag. The device and method disclosed herein may also facilitate the production and distribution of a second puzzle tag that is the inverse image of the first puzzle tag and formed from the materials leftover from construction of the first puzzle tag.

12 Claims, 5 Drawing Sheets

(56) References Cited

U.S. PATENT DOCUMENTS

| | | | | |
|---|---|---|---|---|
| 4,861,620 A * | 8/1989 | Azuma | B41M 5/28 427/556 |
| 4,908,951 A * | 3/1990 | Gurny | G01B 11/005 33/1 M |
| 5,088,181 A * | 2/1992 | Jeppsson | B23Q 1/48 29/563 |
| 5,089,971 A * | 2/1992 | Gerber | B26D 5/00 700/134 |
| 5,151,572 A * | 9/1992 | Jack | B41C 1/145 219/121.69 |
| 5,258,917 A * | 11/1993 | Bruder | B23K 26/032 348/125 |
| 5,262,613 A * | 11/1993 | Norris | B23K 26/10 219/121.68 |
| 5,333,111 A * | 7/1994 | Chaiken | B26D 5/00 382/111 |
| 5,348,843 A * | 9/1994 | Beck | G03C 1/06 359/530 |
| 5,354,414 A * | 10/1994 | Feygin | B29C 67/02 216/34 |
| 5,409,742 A * | 4/1995 | Arfsten | C03C 17/001 427/193 |
| 5,480,308 A * | 1/1996 | Boundy | G09B 23/38 434/296 |
| 5,487,011 A * | 1/1996 | Chaiken | B26D 5/00 356/429 |
| 5,508,936 A * | 4/1996 | King | B26D 5/00 382/111 |
| 5,511,920 A * | 4/1996 | Artrip | B21D 51/383 29/525.06 |
| 5,521,628 A * | 5/1996 | Montgomery | B41J 2/471 347/243 |
| 5,567,207 A * | 10/1996 | Lockman | D06B 11/0096 8/115.52 |
| 5,660,668 A * | 8/1997 | Matheson | B23K 26/08 156/268 |
| 5,801,356 A * | 9/1998 | Richman | B23K 26/18 219/121.68 |
| 5,855,969 A * | 1/1999 | Robertson | B41M 5/267 427/387 |
| 5,990,444 A * | 11/1999 | Costin | B23K 26/03 219/121.61 |
| 6,037,968 A * | 3/2000 | Emge | B23K 26/067 346/107.4 |
| 6,080,958 A * | 6/2000 | Miller | B21D 51/383 219/121.68 |
| 6,160,568 A * | 12/2000 | Brodsky | B23K 26/032 347/238 |
| 6,163,010 A * | 12/2000 | Kobsa | B23K 26/032 219/121.61 |
| 6,165,594 A * | 12/2000 | Moh | G09F 3/02 428/207 |
| 6,173,211 B1 * | 1/2001 | Williams | A41H 3/08 700/131 |
| 6,222,155 B1 * | 4/2001 | Blackmon | B23K 7/002 219/121.39 |
| 6,252,196 B1 * | 6/2001 | Costin | B23K 26/03 219/121.69 |
| 6,298,275 B1 * | 10/2001 | Herman, Jr. | B26D 5/00 382/111 |
| 6,326,586 B1 * | 12/2001 | Heyerick | B23K 26/046 219/121.67 |
| 6,337,122 B1 * | 1/2002 | Grigg | B29C 64/135 428/195.1 |
| 6,476,349 B1 * | 11/2002 | Jendick | B21C 47/34 219/121.68 |
| 6,479,787 B1 * | 11/2002 | Jendick | B21C 47/34 219/121.68 |
| 6,489,985 B1 * | 12/2002 | Brodsky | B23K 26/032 347/237 |
| 6,706,995 B2 * | 3/2004 | Miller | B21D 51/383 219/121.68 |
| 6,856,843 B1 * | 2/2005 | Herman, Jr. | B26D 5/00 700/134 |
| 6,926,487 B1 * | 8/2005 | Jendick | B21C 47/34 413/8 |
| 6,947,802 B2 * | 9/2005 | Picard | B23K 10/00 219/121.39 |
| 6,961,078 B2 * | 11/2005 | Yamate | B23K 26/0613 219/121.77 |
| 7,003,370 B2 * | 2/2006 | Rapoza | B26D 5/00 382/111 |
| 7,136,084 B2 * | 11/2006 | Miller | B23K 26/066 347/225 |
| 7,154,530 B2 * | 12/2006 | Andrews | B23Q 15/013 348/86 |
| 7,204,884 B2 * | 4/2007 | Lunsford | B41J 3/407 118/641 |
| 7,329,830 B2 * | 2/2008 | Baudron | B23K 26/032 219/121.68 |
| 7,780,561 B2 * | 8/2010 | Nosaka | B44C 1/228 156/137 |
| 7,815,124 B2 * | 10/2010 | Schneck | B41M 3/144 235/491 |
| 7,843,479 B2 * | 11/2010 | Spinelli | B41J 3/4075 347/224 |
| 7,947,919 B2 * | 5/2011 | Sukhman | B08B 7/0042 219/121.67 |
| 7,952,602 B2 * | 5/2011 | Govorkov | B31D 1/027 347/241 |
| 8,071,912 B2 * | 12/2011 | Costin, Sr. | B44C 1/005 219/121.85 |
| 8,354,611 B2 * | 1/2013 | Govorkov | B23K 26/361 219/121.69 |
| 8,433,435 B2 * | 4/2013 | Fagan | B23K 7/105 219/121.69 |
| 8,558,859 B2 * | 10/2013 | Jerman | B41J 2/473 347/241 |
| 8,640,413 B2 * | 2/2014 | Ruggie | B44C 1/228 144/358 |
| 8,921,732 B2 * | 12/2014 | Costin | B44C 1/228 219/121.6 |
| 8,988,477 B2 * | 3/2015 | Govorkov | B41J 2/442 347/241 |
| 9,046,888 B2 * | 6/2015 | Garaas | G05B 19/4061 |
| 9,096,092 B2 * | 8/2015 | Michenet | B23K 26/0673 |
| 9,186,924 B2 * | 11/2015 | Lewis | B41M 5/24 |
| 9,278,776 B2 * | 3/2016 | Ramsey | B41M 5/28 |
| 9,373,211 B2 * | 6/2016 | Rose, Jr. | G07F 11/34 |
| 9,592,569 B2 * | 3/2017 | Reed | B23K 26/0846 |
| 9,765,460 B2 * | 9/2017 | Schwarzberger | D05B 19/08 |
| 9,782,788 B2 * | 10/2017 | Sais | B32B 37/26 |
| 9,839,975 B2 * | 12/2017 | Beutler | B23K 26/03 |
| 10,195,682 B2 * | 2/2019 | Fagan | B23K 10/006 |
| 10,275,722 B2 * | 4/2019 | White | G01B 11/002 |
| 10,328,459 B2 * | 6/2019 | Chisholm | B05D 7/00 |
| 2002/0179580 A1 * | 12/2002 | Costin | B41M 5/24 219/121.68 |
| 2003/0015507 A1 * | 1/2003 | Miller | B21D 51/383 219/121.68 |
| 2009/0001063 A1 * | 1/2009 | Weick | B23K 26/032 219/121.85 |
| 2009/0240368 A1 * | 9/2009 | Young, Jr. | B23K 31/10 700/166 |
| 2010/0006546 A1 * | 1/2010 | Young | B44C 1/228 219/121.69 |
| 2015/0165277 A1 * | 6/2015 | Ono | A63B 45/00 264/400 |
| 2015/0298335 A1 * | 10/2015 | Perron | B26D 5/007 83/13 |
| 2016/0016273 A1 * | 1/2016 | Honegger | B23K 26/0823 356/634 |
| 2017/0045877 A1 * | 2/2017 | Shapiro | B23K 37/0235 |

OTHER PUBLICATIONS

YouTube video clip entitled "Difference between CNC Laser Fiber Marking and CO2 Engraving Anodized Aluminium" uploaded on

(56) References Cited

OTHER PUBLICATIONS

Oct. 18, 2015 by user CNCKing.com. Retrieved from Internet: <https://www.youtube.com/watch?v=m7Ykhl6lPOU>. (Year: 2015).*
YouTube video clip entitled "stainless steel color laser engraving, nameplate laser engraving, China fiber laser mark" uploaded on Oct. 27, 2014 by user Dumphy Chistina. Retrieved from Internet: <https://www.youtube.com/watch?v=LIWdF-nLz1k>. (Year: 2014).*
YouTube video clip entitled "Laser Engraving Steel | Automated XY Table System" uploaded on Sep. 7, 2012 by user Control Laser Corp. Retrieved from Internet: <https://www.youtube.com/watch?v=d2jSfEply70>. (Year: 2012).*

* cited by examiner

KIOSK AND METHOD FOR MAKING PUZZLE TAGS

FIELD OF THE INVENTION

A preferred implementation of the present invention refers generally to a device and method for making puzzle tags.

BACKGROUND

Although a wide variety of kiosks that enable users to create customized goods are known in the art, these kiosks frequently generate unnecessary waste. This waste generally consists of material leftover from the materials used to create the customized good ordered by a user. Because these kiosks are generally incapable of reusing or repurposing such leftover material for later use by the kiosk, the leftover material is frequently discarded as unusable waste. Thus, unless the leftover material is repurposed or reused, the kiosk will produce more and more waste with each successive customer good produced by the kiosk. Accordingly, known kiosks of this kind often produce unnecessary waste that adversely impacts the environment. Moreover, because not all aspects of the material used to create a customized consumer good are utilized, such kiosks are also inefficient in terms of material efficiency, and thus cause owners of such kiosks to incur undue materials costs.

Accordingly, a need exists for a device and method that can effectively repurpose and reuse leftover materials within the device as a means to reduce environmental harm and unnecessary materials costs.

SUMMARY

In one aspect, a device and method for making user-designed puzzle tags are provided. In a preferred embodiment, the device of the present disclosure is a kiosk configured to allow a customer to construct a puzzle tag based on an image constructed by the user via a graphical user interface. The graphical user interface is configured to receive a cutting pattern selection input from the customer, wherein the cutting pattern selection input is indicative of the image constructed by the customer. A controller operably connected to the graphical user interface receives the cutting pattern selection input and communicates the input to a cutting instrument that is configured to cut tag plates.

The cutting instrument then cuts a first tag plate into a first image portion and a first background portion and a second tag plate into a second image portion and a second background portion based on the cutting pattern selection input communicated by the controller. The second image portion is substantially similar in shape to the first image portion, and the second background portion is substantially similar in shape to the first background portion. The first image portion and second background portion pieces resulting from the cutting instrument's cuts of the first tag plate and second tag plate form a puzzle tag representing the image constructed by the customer via the graphical user interface, i.e. the customer-designed puzzle tag. Conversely, the second image portion and first background portion form a puzzle tag having an inverse image of the image constructed by the customer via the graphical user interface, i.e., an inverse image puzzle tag. Accordingly, even though there is material leftover from the construction of the customer-designed puzzle tag, the leftover materials form a second, inverse-image puzzle tag that may be delivered to the customer or stored for later use. In this way, the kiosk of the present disclosure effectively produces little, if any, waste and uses substantially all aspects of the materials (tag plates) used to construct a customer's product. In a preferred embodiment, the first tag plate and second tag plate are different colors. Thus, the respective colors of the image portion and the background portion of the inverse puzzle tag will be reversed from the colors of the image and background portions of the first, customer-designed puzzle tag.

After the first tag plate and second tag plate are cut by the cutting instrument, a sorting system groups the first image portion and second background portion together and delivers those portions to the customer. Preferably, the first image portion and second background portion are delivered to the customer in separate pieces such that the user can assemble the pieces like a puzzle to reconstruct the image the customer designed via the graphical user interface. In one preferred embodiment, the graphical user interface is configured to prompt the customer to request delivery of the second image portion and first background portion. In such an embodiment, the sorting system is further configured to group the second image portion and first background portion together and either store those portions for later use or deliver those portions to the customer based on the customer response to the prompt generated by the graphical user interface.

The foregoing summary has outlined some features of the device and methods of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the device and methods disclosed herein. Those skilled in the pertinent art should also realize that such equivalent designs or modifications do not depart from the scope of the device and methods of the present disclosure.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
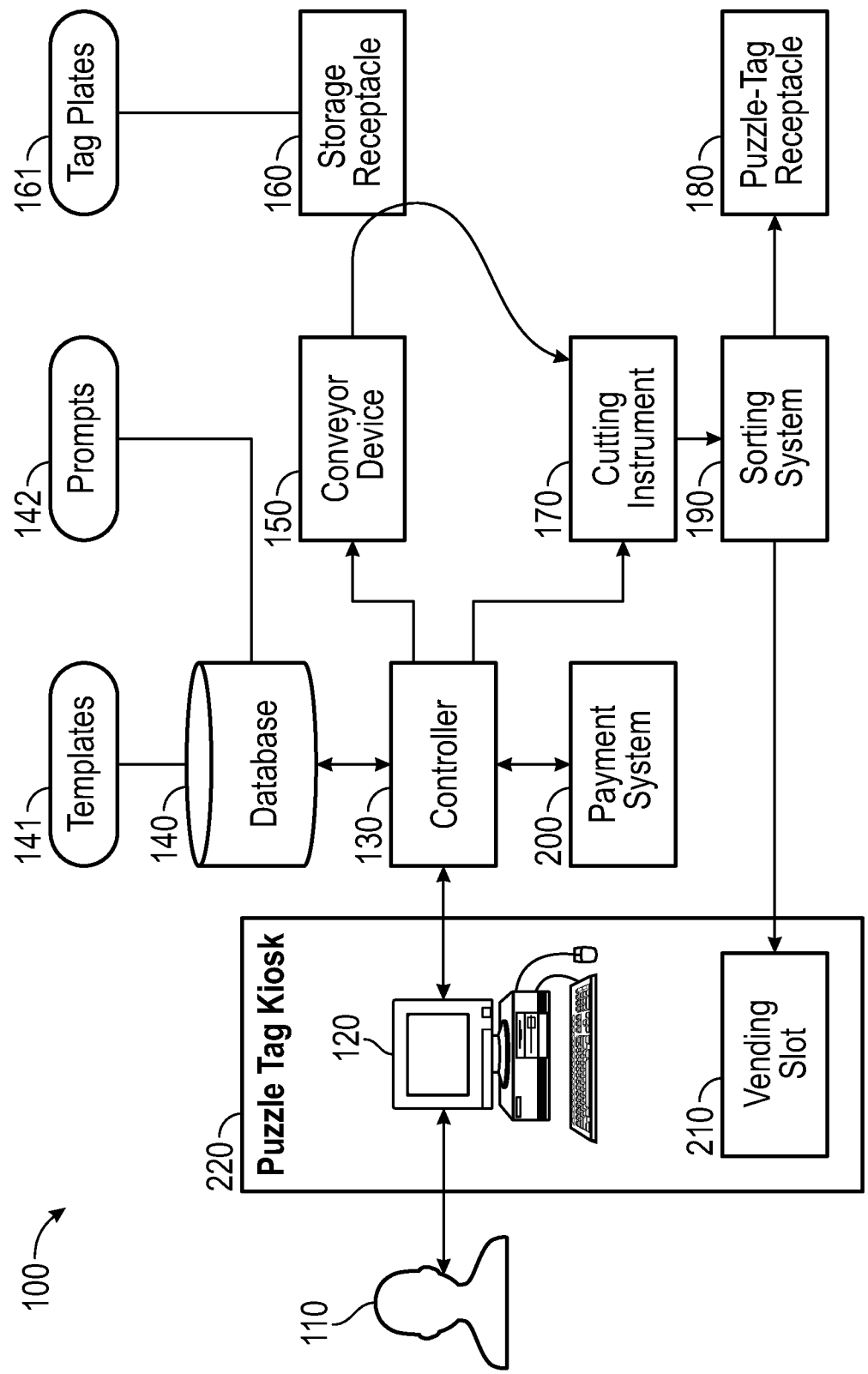
FIG. 1 shows a block diagram illustrating one preferred embodiment of a kiosk consistent with the principles of the present disclosure.

In one aspect, a kiosk for creating customer-designed puzzle tags is provided. FIG. 1 shows a preferred embodiment of a kiosk consistent with the principles of the present disclosure. As illustrated in FIG. 1, a customer 110 interacts with the kiosk 100 by using a graphical user interface 120 configured to receive a cutting pattern selection input from the customer 110. The cutting pattern selection input is generated by the customer 110 constructing an image via the graphical user interface 120, i.e, the cutting pattern selection input is indicative of the image constructed by the customer 110. An image constructed by a customer 110 may include, but is not limited to, a background, text, numerals, cutting pattern designs, engraving pattern designs, an image portion color, a background portion color, or any combination thereof.

As further illustrated in FIG. 1, to facilitate the construction of an image, in one preferred embodiment, the graphical user interface 120 may have a display screen operably connected to a mouse, a keyboard, or both. In one preferred embodiment, the graphical user interface 120 has a touch-screen display that allows a customer 110 to construct an image by touching the display screen of the graphical user interface 120. It is understood that the graphical user interface 120 may be configured to receive or utilize any input device configured to assist a customer 110 in creating an image on the graphical user interface 120. For instance, input devices that may be utilized may include, but are not limited to, digital drawing pads, styli, memory cards containing pre-existing images, or any other similar input devices.

Operably connected to the graphical user interface 120 is a controller 130 configured to receive a cutting pattern selection input from the graphical user interface 120 and communicate the cutting pattern selection input to a cutting instrument 170 that is responsive to signals received from the controller 130. In one preferred embodiment, the controller 130 comprises a processor that receives, processes, and communicates the cutting pattern selection input. In another preferred embodiment, the controller 130 comprises a processor and a memory device, wherein the memory device is configured to store one or more image-editing applications. In such embodiments, the image-editing applications may be utilized to aid a customer 110 in constructing an image via the graphical user interface 120. Image-editing applications that may be stored in the memory device include, but are not limited to, CorelDRAW, Photoshop, Gimp, or any other application that enables users to construct and edit digital images. Further, it is understood that the present disclosure contemplates both embodiments wherein the memory device within the controller 130 is separate from the processor as well as embodiments wherein the memory device is included within the processor. Moreover, it is understood that the present disclosure contemplates alternative embodiments wherein the cutting pattern selection input is received and communicated by the controller 130 without the use of a processor.

Figure 3:
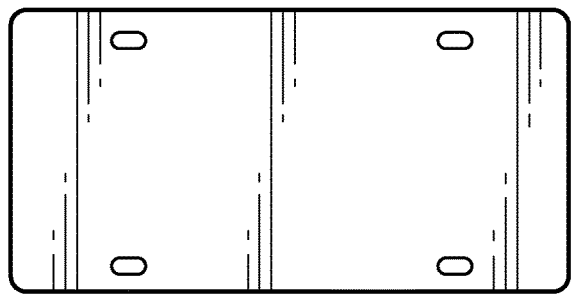
FIG. 3 illustrates an example of an uncut tag plate consistent with the principles of the present disclosure.

The kiosk 100 utilizes a plurality of tag plates 161, which serve as the raw material cut by the cutting instrument 170 to create a customer's designed puzzle tag. FIG. 3 illustrates an example of an uncut tag plate that may be utilized in accordance with the present disclosure. In one preferred embodiment, the kiosk 100 has a storage receptacle 160 configured to house tag plates 161 prior to cutting or engraving. The tag plates 161 utilized by the kiosk 100 are preferably of various colors. Further, each tag plate within the plurality of tag plates 161 may be monochromatic, dichromatic, or multicolored. Due to the strength of material and ease of cutting, it is generally preferable that the tag plates 161 are made of an acrylic material. However, it is understood that the present disclosure contemplates embodiments wherein the tag plates 161 may be made of other materials including, but not limited to, various types of plastic, as well as metal, rubber, or glass.

Figure 6:
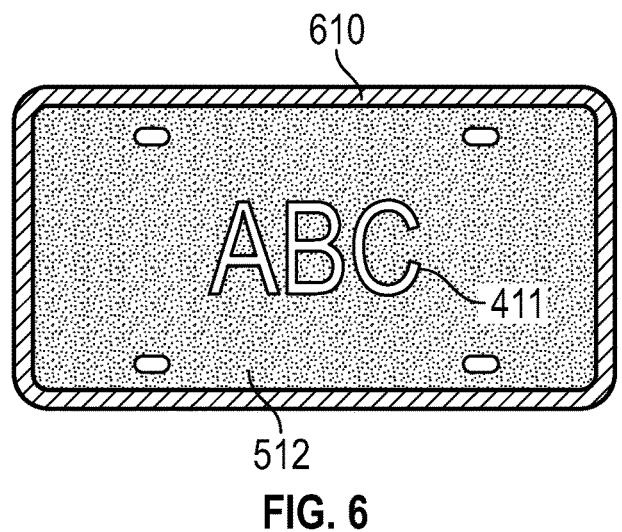
FIG. 6 illustrates an example of an assembled puzzle tag consistent with the principles of the present disclosure.
Figure 7:
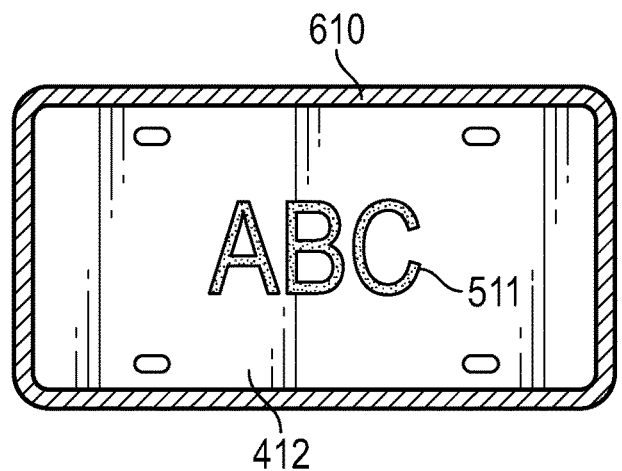
FIG. 7 illustrates an example of an assembled puzzle tag consistent with the principles of the present disclosure.

In a preferred embodiment, the finished puzzle tag product may be utilized as a decorative car license plate. In order to match the conventional sizing parameters of standard license plates, the tag plates 161 are preferably about twelve inches in width and about six inches in height. However, it is understood that the width and height dimensions may be varied as desired. In one preferred embodiment, the tag plates 161 are one-eighth inches in thickness, though the thickness may also be varied. As illustrated in FIGS. 3-7, in one preferred embodiment, the tag plates have one or more holes on each plate's surface to enable a customer 110 to mount the puzzle tag once assembled. FIGS. 6 and 7 provide examples of assembled puzzle tags constructed in accordance with the present disclosure.

To cut the tag plates 161, a cutting instrument 170 configured to cut tag plates 161 according to signals received from the controller 130 is used. The signals received by the cutting instrument correspond to the cutting pattern selection input generated by the customer 110.

Figure 4:
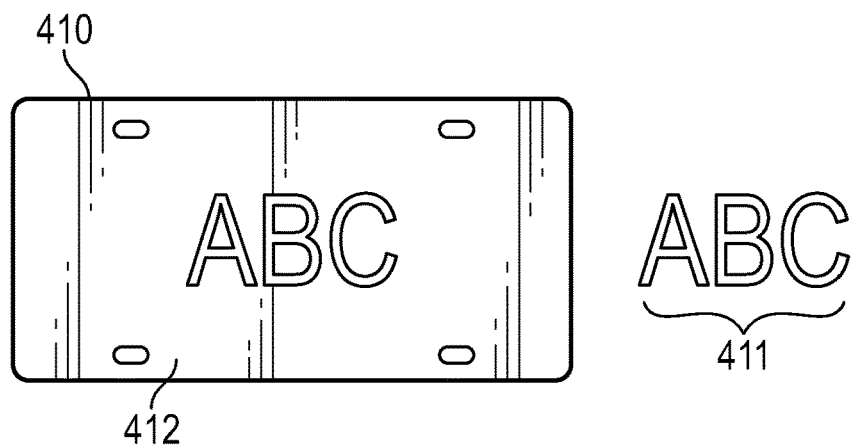
FIG. 4 illustrates an example of a cut first tag plate consistent with the principles of the present disclosure.
Figure 5:
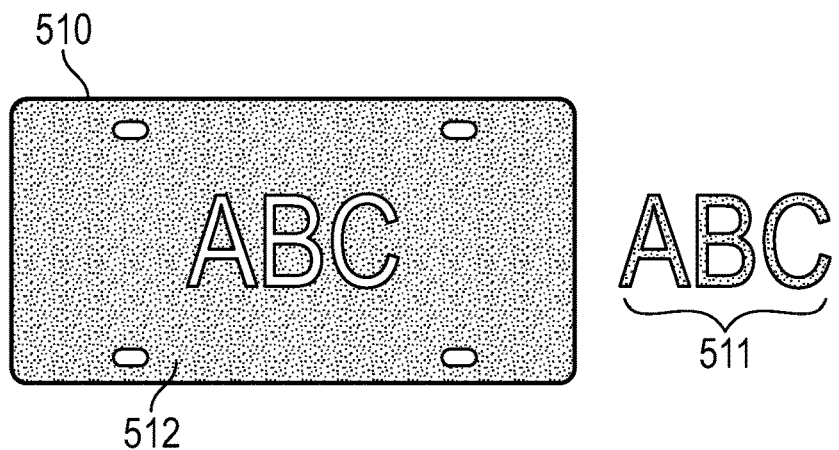
FIG. 5 illustrates an example of a cut second tag plate consistent with the principles of the present disclosure.

FIGS. 4 and 5 illustrate a first tag plate 410 and a second tag plate 510, respectively, cut in accordance with the present disclosure. As shown in FIGS. 4-5, the cutting instrument 170 is configured to cut the first tag plate 410 into a first image portion 411 and a first background portion 412. The cutting instrument 170 is further configured to cut the second tag plate 510 according to a substantially similar cutting pattern such that the second tag plate 510 is cut into a second image portion 511 substantially similar in shape to the first image portion 411 and a second background portion 512 substantially similar in shape to the first background portion 412. In this way, a first image portion 411 and second background portion 512 may be combined to form a puzzle tag as shown in FIG. 6, wherein the puzzle tag has an image substantially similar to the image constructed by the customer 110. In addition, the second image portion 511 and first background portion 412 may be combined to form a puzzle tag, as shown in FIG. 7, having an inverse image of the image constructed by the customer 110. In a preferred embodiment, the first tag plate 410 and second tag plate 510 are different colors. Thus, the respective colors of the image portion and the background portion of the inverse puzzle tag, as shown in FIG. 7, will be reversed from the colors of the image and background portions of the first, customer-designed puzzle tag, as shown in FIG. 6.

In one preferred embodiment, the cutting instrument 170 is configured to engrave tag plates 161 according to signals received from the controller 130. The signals received by the cutting instrument correspond to the cutting pattern selection input generated by the customer 110. As the cutting pattern selection input generated by a customer 110 may contain engraving pattern designs, cutting pattern designs, or both, the kiosk 100 is can make puzzle tags that are only engraved, only cut, or both engraved and cut. In cases where the cutting pattern selection input generated by the customer 110 contains both cutting designs and engraving designs, it is generally preferred that the cutting instrument 170 engrave a tag plate before cutting the tag plate.

Figure 9:
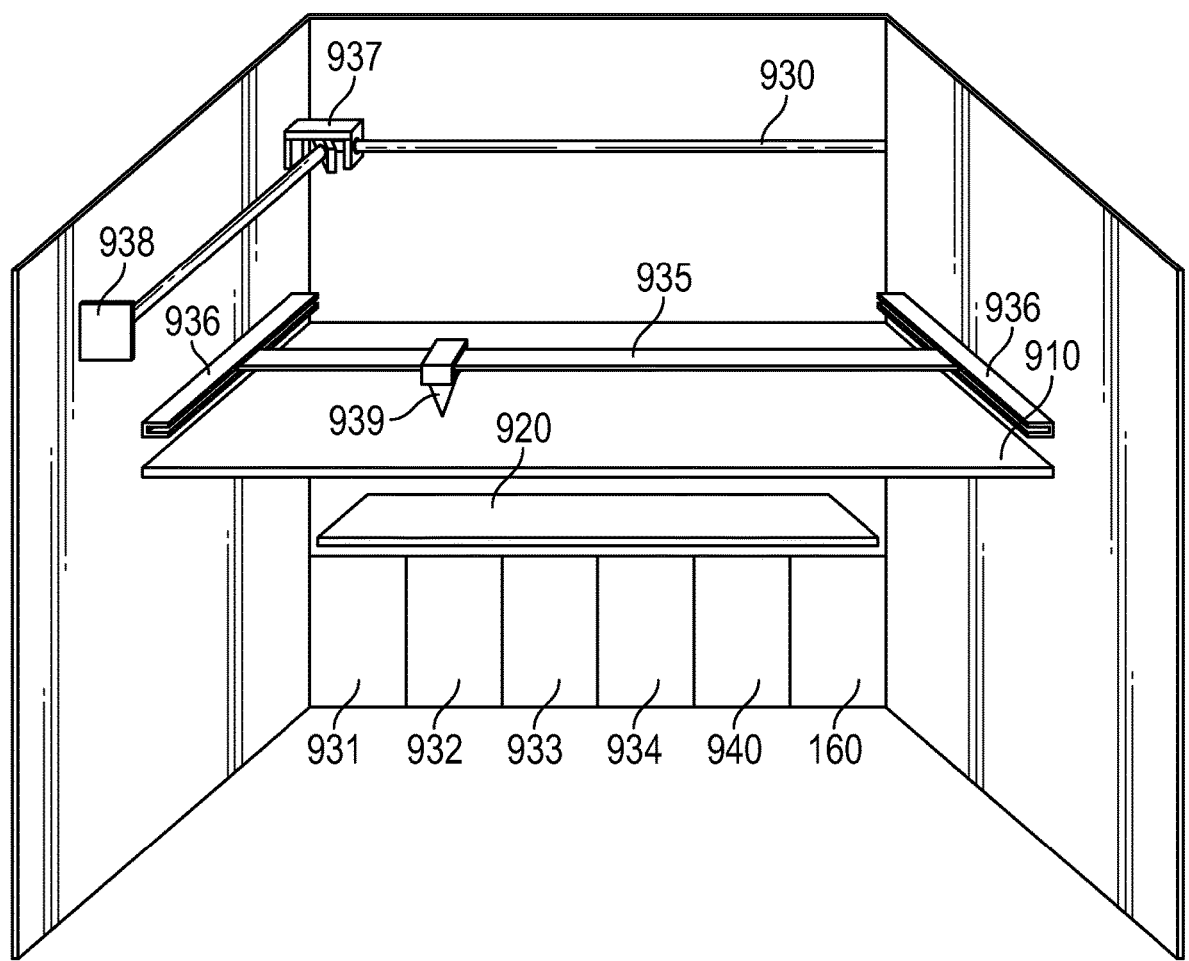
FIG. 9 shows a preferred embodiment of a cutting instrument consistent with the principles of the present disclosure.

In a preferred embodiment, the cutting instrument 170 is a laser-cutting apparatus. However, those skilled in the art should appreciate that any type of cutting device suitable for cutting tag plates 161 may be utilized as the cutting instrument 170 in accordance with the principles of the present disclosure. FIG. 9 is meant to provide a general representation of one preferred embodiment wherein a laser-cutting apparatus is utilized as the cutting instrument 170. It is understood that the orientation of the laser-cutting apparatus as shown within FIG. 9 is merely for demonstrative purposes only and that the present disclosure contemplates all possible of arrangements or orientations of the various components comprising the laser-cutting apparatus within the kiosk 100 as disclosed herein, except where context excludes otherwise. In embodiments utilizing a laser-cutting apparatus as the cutting instrument 170, the laser-cutting apparatus preferably comprises a laser device, a cutting table 910, and a catch tray 920, as shown in FIG. 9. The laser device of the laser-cutting apparatus preferably comprises at least one laser tube 930, a water supply 931, a water chiller 932, an air supply 933, an air exhaust 934, at least one x-axis guide rail 935, at least one y-axis guide rail 936, a power supply (not shown), at least one beam combiner 937, at least one laser lens (not shown), at least one laser mirror 938, and at least one laser head 939. It is understood that the present disclosure contemplates embodiments wherein the water supply 931 and the water chiller 932 are contained within a single water system within the kiosk 100 as well as embodiments wherein the air supply 933 and the air exhaust 934 are contained within a single air system within the kiosk 100. To expedite the cutting process, in one preferred embodiment, the laser device of the laser-cutting apparatus comprises a dual-head laser. In such embodiments, the laser device has two or more laser heads 939 and two or more laser tubes 930. In one preferred embodiment, the at least one laser tube 930 of the laser device is carbon-dioxide based. However, it is understood that the present disclosure contemplates embodiments where the at least one laser tube 930 is carbon-monoxide based, helium-neon based, nitrogen based, transversely excited atmospheric (TEA) based, or any other gas or configuration conventionally used for gas-based lasers. Moreover, the present disclosure further contemplates embodiments wherein the laser device is a chemical, excimer, ion, metal-vapor, dye, solid-state, free-electron, or gas-dynamic laser.

In one preferred embodiment, the laser table 910 of the laser-cutting apparatus has a series of holes extending through its surface to allow the laser beam emitted from the laser device and air to pass through to the tag plate being cut by the laser device. In another preferred embodiment, the cutting table 910 is configured such that it may lift the material being cut above a work surface to facilitate cleaner cuts by the laser beam emitted by the laser device and reduce underside reflections of the laser beam. In one preferred embodiment, the catch receptacle 920 of the laser-cutting apparatus is configured to receive materials cut by the laser device from the cutting table 910. In such embodiments the catch tray 920 is subsequently tilted or moved such that the image portions 411, 511 and background portions 412, 512 of the first tag plate 410 and the second tag plate 510 are delivered to the sorting system 190.

After the first tag plate 410 and second tag plate 510 have been cut by the cutting instrument 170, the first image portion 411 and second image portion 511 may comprise one or more pieces. For instance, in the first image portion 411 and second image portion 511 shown in FIGS. 4-5, the characters of "A", "B", and "C" are each individual pieces separate and apart from one another. The present disclosure also contemplates embodiments wherein the first background portion 412 and second background portion 512 may comprise one or more pieces. Preferably, the first tag plate 410 and second tag plate 510 are different colors.

After the first tag plate 410 and second tag plate 510 are cut by the cutting instrument 170, a sorting system 190 then groups the first image portion 411 and the second background portion 512 together and delivers the first image portion 411 and the second background portion 512 to the customer 110. In one preferred embodiment, the sorting system 190 is further configured to group the second image portion 511 with the first background portion 412. In this way, the second image portion 511 and the first background portion 412 can be used to form a puzzle tag 700 having an inverse image, with respect to color, as compared to the image displayed by the puzzle tag of FIG. 6, which represents the image constructed by the customer 110 via the graphical user interface 120.

Figure 2:
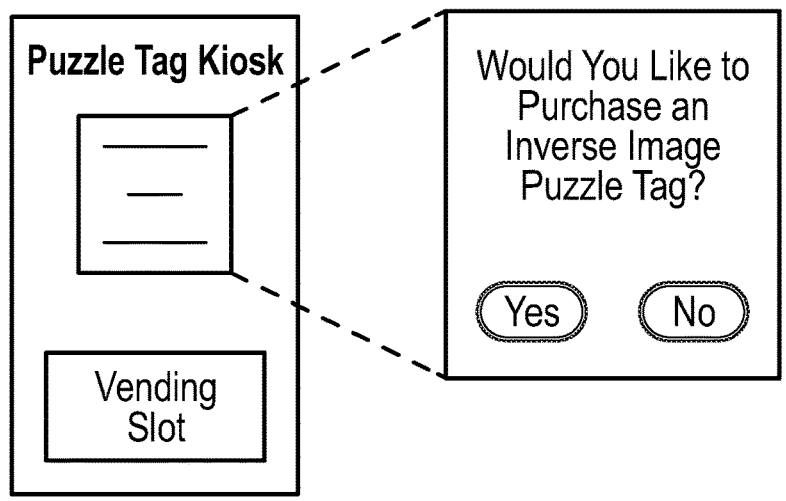
FIG. 2 illustrates an example user interface containing a prompt according to one embodiment consistent with the principles of the present disclosure.

In one preferred embodiment, the graphical user interface 120 is configured to prompt the customer 110 to request delivery of the second image portion 511 and the first background portion 412. FIG. 2 illustrates an example of such a prompt. Based on the customer's selection or response to the prompt, the second image portion 511 and first background portion 412 will either be delivered to the customer 110 via the sorting system 190 or will be stored for later use. Later use of these materials may include, but are not limited to, reselling the second image portion 511 and first background portion 412 as a grouped pair to a subsequent customer, utilizing the second image portion 511 for a subsequent customer's puzzle tag, or utilizing the first background portion 412 for a subsequent customer's puzzle tag. Accordingly, in this way, the kiosk 100 of the present disclosure has the ability to reuse or repurpose substantially every portion of the tag plates 161 utilized by the kiosk 100, thus reducing waste and materials costs.

In one preferred embodiment, the kiosk 100 has a puzzle-tag receptacle 180 that is configured to receive and house the grouped second image portion 511 and first background portion 412 for later use if a customer 110 does not request delivery of the second image portion 511 and first background portion 412. In one preferred embodiment, the sorting system 190 delivers the second image portion 511 and first background portion 412 to the puzzle-tag receptacle 180 if a customer 110 does not request delivery of the second image portion 511 and first background portion 412. In another preferred embodiment, a conveyor device 150, as described below, delivers the second image portion 511 and first background portion 412 to the puzzle-tag receptacle 180 if a user does not request delivery of the second image portion 511 and first background portion 412.

In one preferred embodiment, the kiosk 100 has a payment system 200 configured to receive payment from a customer 110, as illustrated in FIG. 1. In one preferred embodiment, the payment system 200 is operably connected to the controller 130. In such embodiments, the payment system 200 serves as a communication gate for the controller 130 such that the controller 130 will not communicate signals indicative of the cutting pattern selection input to the cutting instrument 170 or will not receive the cutting pattern selection input from the graphical user interface 120, or both, until the payment system 200 verifies a customer 110 has made sufficient payment. In another preferred embodiment, the payment system 200 serves as a communication gate for the controller 130 such that the controller will not communicate signals to the sorting system 190 directing the sorting system 190 to group and deliver image and background portions until the payment system 200 verifies a customer 110 has made sufficient payment. In one preferred embodiment, the payment system 200 is configured to receive cash and/or credit cards.

In one preferred embodiment, the image and background portions of the first tag plate 410 and the second tag plate 510 have an adhesive material attached thereto to facilitate adherence of the image and background portions of the tag plates 410, 510 to a desired surface, such as a wall. In another preferred embodiment, the kiosk 100 utilizes a plurality of backing plates 610. The backing plates 610 may be used as a base to which the image and background portions can be attached by the user to construct a finished puzzle tag, as shown in FIGS. 6-7. For example, as illustrated in FIGS. 6 and 7, the backing plates 610 are preferably sized to hold the first image portion 411 and the second background portion 512, or the second image portion 511 and first background portion 412. In such embodiments, the sorting system 190 may be further configured to deliver a backing plate 610 along with the first image portion 411 and second background portion 512, or along with the second image portion 511 and first background portion 412, to a customer 110. The backing plate 610 is preferably made of acrylonitrile butadiene styrene ("ABS"). However, it is understood that the backing plate 610 may be made of any thermoplastic polymer, wood, metal, rubber, glass, or other suitable material. In one preferred embodiment, the backing plate 610 is one-sixteenth inches in thickness although the thickness may be varied. In one preferred embodiment, each backing plate 610 has an adhesive material attached thereto to facilitate adherence of the image and background portions of the tag plates 410, 510 thereto.

As illustrated in FIG. 1, in one preferred embodiment, the kiosk 100 utilizes at least one conveyor device 150 operably connected to the controller 130 and configured to receive signals from the controller 130 such that the conveyor device 150 can transport tag plates 161 to the cutting instrument 170 based on the signals received from the controller 130. The signals received by the conveyor device 150 from the controller 130 correspond to the image constructed by the customer 110 via the graphical user interface 120. For example, if a customer 110 constructs an image wherein the image portion of the constructed image is gold in color and the background portion of the constructed image is blue in color, the conveyor device 150 will retrieve and transport a gold-colored tag plate and a blue-colored tag plate to the cutting instrument 170. In one preferred embodiment, the conveyor device 150 may comprise a robotic arm. In another preferred embodiment, the conveyor device 150 may comprise a conveyor belt.

In one preferred embodiment, the kiosk 100 has a database 140 storing cutting-pattern templates 141. The database 140 is operably connected to the graphical user interface such that the cutting-pattern templates 141 can be presented to a customer 110 via the graphical user interface 120. Preferably, the cutting pattern templates 141 stored within the database 140 may be used by a customer 110 to assist in the construction of an image via the graphical user interface 120. Thus, a customer 110 may construct an image by creating a unique image or by selecting an image from a group of templates 141. In addition, a template 141 may be selected and altered by the user to form a new image. The cutting-pattern templates 141 stored within the database 140 may include, but are not limited to, cutting templates pertaining to alphabetical characters, texts, numerals, designs, images, clipart, and color as well as engraving templates pertaining to alphabetical characters, texts, numerals, designs, images, and clipart. In another preferred embodiment, the database is configured to store cutting pattern selection inputs generated by customers for later use.

It is understood that the present disclosure contemplates both embodiments wherein the database 140 is operably connected to the graphical user interface 120 through the use of the controller 130, as illustrated in FIG. 1, as well as embodiments wherein the database 140 is directly connected to the graphical user interface 120. Moreover, it is understood that the present disclosure contemplates both embodiments wherein the database 140 is within the controller 130 as well as embodiments where the database 140 is a separate entity apart from the controller 130.

As illustrated in FIGS. 1 and 2, the database 140 may also store a series of prompts 142 that may be presented to a customer 110 via the graphical user interface 120, wherein the prompts 142 provide information to a customer 110 or direct a customer 110 to take certain actions. For instance, one prompt, as illustrated in FIG. 2, may ask a customer 110 if the customer 110 would like to purchase an inverse image puzzle tag, wherein the inverse image puzzle tag is a puzzle tag having the inverse image of the image constructed by the customer 110, i.e., the second image portion 511 of the second tag plate 510 and the first background portion 412 of the first tag plate 410.

In another preferred embodiment, the kiosk has an external housing 220. The external housing may house the controller 130, database 140, conveyor device 150, storage receptacle 160, tag plates 161, cutting instrument 170, puzzle-tag receptacle 180, sorting system 190, payment system 200, or any combination thereof. In one preferred embodiment, the external housing 220 may partially house the graphical user interface 120 such that at least the display of the graphical user interface 120 is accessible to a customer 110. In one preferred embodiment, the external housing 220 has a vending slot 210 configured to deliver the grouped image portion and background portion received from the sorting system 190. Preferably, the vending slot 210 is oriented on the external housing 220 such that the vending slot 210 is accessible to a customer 110. In one preferred embodiment, the kiosk 100 has a fire extinguisher system 940 that is configured to detect the presence of a fire within the kiosk and is further configured to extinguish the fire after such detection, as shown in FIG. 9.

Figure 8:
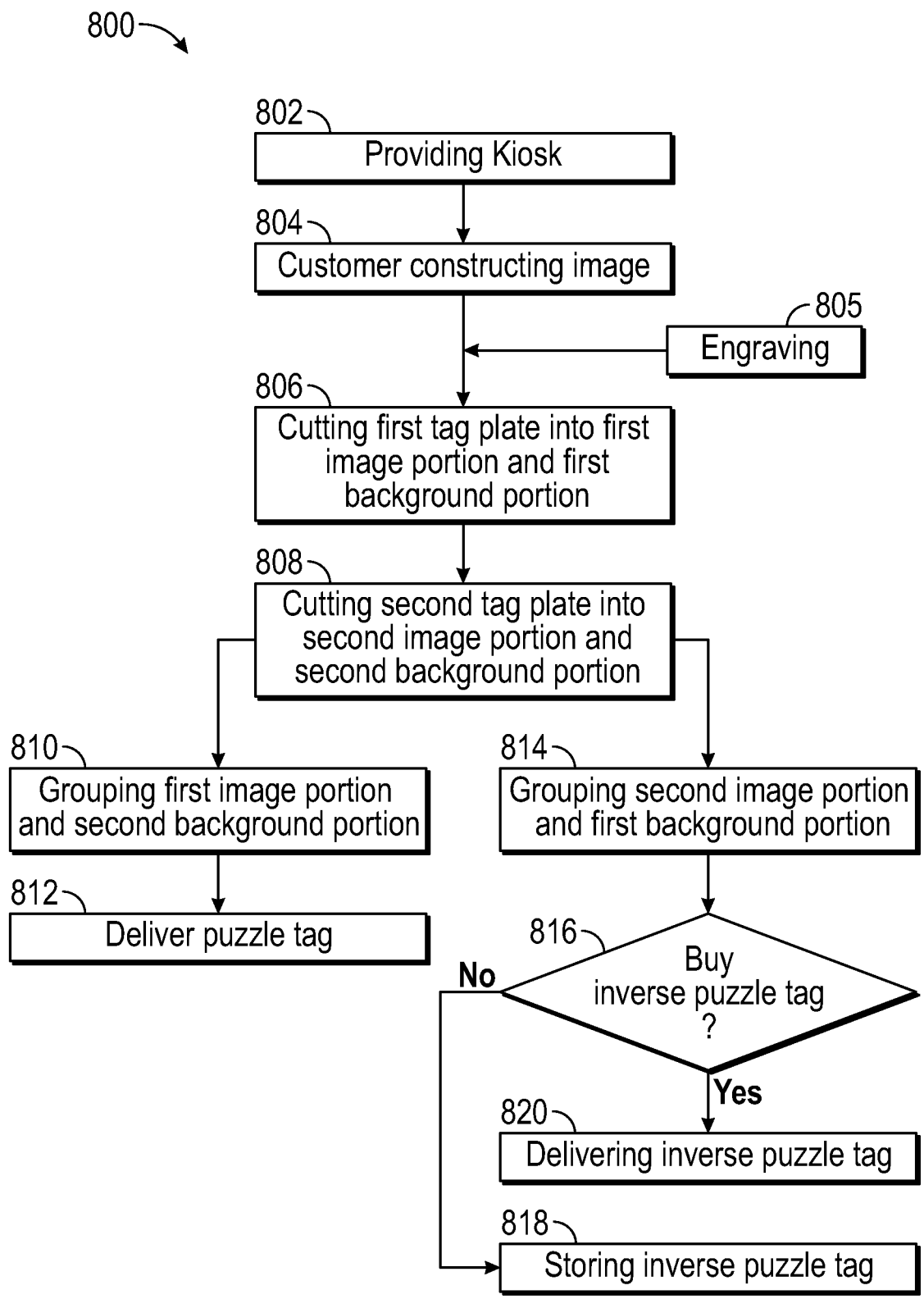
FIG. 8 shows a flowchart illustrating a method for creating puzzle tags consistent with the principles of the present disclosure.

FIG. 8 shows a flowchart 800 illustrating steps for creating puzzle tags utilizing a kiosk 100. Step 802 indicates the initial step of providing a kiosk 100 in accordance with the present disclosure. Preferably, the kiosk 100 comprises a graphical user interface 120 configured to receive a cutting pattern selection input form a customer 110, a controller 130 operably connected to the graphical user interface, a cutting instrument 170 responsive to signals received from the controller 130, a plurality of tag plates 161, and a sorting system 190. In input step 804, a customer inputs a cutting pattern selection input into the kiosk 100 by constructing an image via a graphical user interface 120. A controller 130 then communicates signals indicative of the cutting pattern selection input to the cutting instrument 170.

In step 806, after the cutting pattern selection input has been communicated, the cutting instrument 170 then cuts a first tag plate 410 into a first image portion 411 and into a first background portion 412. In step 808, the cutting instrument 170 cuts a second tag plate 510 into a second image portion 511 and a second background portion 512. The second tag plate 510 is cut according to a substantially similar cutting pattern as the first tag plate 410 such that the second tag plate 510 is cut into a second image portion 511 substantially similar in shape to the first image portion 411 and the second background portion 512 is substantially similar in shape to the first background portion 412. The first tag plate 410 used in step 806 is preferably a different color than the second tag plate 510 used in step 808. Although illustrated as separate steps, it is understood that the present disclosure contemplates methodologies wherein steps 806 and 808 are carried out simultaneously.

In step 810, the first image portion 411 and second background portion 512 are grouped together and subsequently delivered to the customer 110 in step 812. The first image portion 411 and second background constituting a puzzle tag having the image constructed by the customer 110 when assembled, as shown in FIG. 6. A sorting system 190 groups and subsequently delivers the first image portion 411 and second background portion 512 in steps 810 and 812, respectively. Step 812 may include delivering a backing plate 610 along with the first image portion 411 and second background portion 512.

In step 814, the second image portion 511 and first background portion 412 are grouped together. The second image portion 511 and first background portion 412 generally constitute a puzzle tag having the inverse image of the image constructed by the customer 110 via the graphical user interface 120, as shown in FIG. 7. The second image portion 511 and first background portion 412 are grouped together via the sorting system 190. It is understood that the second image portion 511 and first background portion 412 may be grouped before, after, or at the same time the first image portion 411 and second background portion 512 are grouped together.

In step 816, a prompt asking the customer 110 if the customer 110 would like to request delivery of the second image portion 511 and the first background portion 412 is generated and presented to the customer 110 via the graphical interface 120. Based on the customer's answer to the prompt, either step 818 or step 820 will be carried out. If the customer 110 chooses not to request delivery of the second image portion 511 and the first background portion 412, then step 818 is executed and the second image portion 511 and first background portion 412 will be stored for later use. If the customer 110 does request delivery of the second image portion 511 and first background portion 412, then step 820 is executed and the second image portion 511 and the first background portion 412 ("inverse puzzle tag") is delivered to the customer 110. Step 820 may include delivering a backing plate 610 along with the second image portion 511 and first background portion 412.

In one preferred embodiment, the kiosk 100 provided in step 802 has a payment system 200 configured to receive payment from a customer 110. By utilizing the payment system 200, a payment verification step may be implemented in the method for creating puzzle tags as disclosed herein. In the payment verification step, the payment system 200 takes payment and verifies that a customer 110 has made a sufficient payment before any step subsequent to the payment verification step may be carried out. For instance, in one preferred methodology, after step 804 is completed, the payment system 200 may verify the customer 110 has made sufficient payment before any subsequent step can be carried out (steps 806-820). However, it is understood that the present disclosure contemplates methodologies wherein the payment verification step carried out by the payment system 200 may be implemented before or after any step illustrated in FIG. 8. Preferably, there is only one payment verification step. However, the present disclosure contemplates alternative methodologies wherein more than one payment verification step is implemented. For instance, in a methodology implementing two payment verification steps, a payment verification step may be implemented between steps 804 and 806 and between steps 816 and 820.

As further illustrated in FIG. 8, in instances where the cutting pattern selection input inputted by a customer 110 includes engraving pattern designs, an engraving step 805 may be implemented in the method for creating puzzle tags as disclosed herein. In the engraving step 805, the cutting instrument 170 engraves the first tag plate 410 and the second tag plate 510 according to the engraving pattern design within the cutting pattern selection input inputted the customer 110. Preferably, the engraving step 805 takes place before the first tag plate 410 and second tag plate 510 are cut into image and background portions in steps 806 and 808, respectively, as shown in FIG. 8. However, it is understood that the present disclosure contemplates embodiments wherein the engraving step 805 may take place after step 806 or 808.

It will be readily understood to those skilled in the art that various other changes in the details, material, and arrangements of the parts and method stages which have been described and illustrated in order to explain the nature of this inventive subject matter can be made without departing from the principles and scope of the inventive subject matter.

What is claimed is:

1. A kiosk for creating puzzle tags, said kiosk comprising:
    a. a graphical user interface configured to receive a cutting pattern selection input from a customer;
    b. a controller operably connected to the graphical user interface;
    c. a cutting instrument responsive to signals received from the controller;
    d. a plurality of tag plates,
        wherein the cutting instrument is configured to cut a first tag plate according to a cutting pattern selection input by the customer such that the first tag plate is cut into a first image portion and a first background portion, and wherein the cutting instrument is further configured to cut a second tag plate according to a substantially similar cutting pattern such that the second tag plate is cut into a second image portion substantially similar in shape to the first image portion and a second background portion substantially similar in shape to the first background portion; and e. a conveyor device responsive to signals received from the controller and configured to deliver tag plates to the cutting instrument based on signals received from the controller.

2. The kiosk of claim 1, wherein the graphical user interface is configured to prompt the customer to request delivery of the second image portion and the first background portion.

3. The kiosk of claim 2, further comprising a puzzle-tag receptacle configured to receive and house the second image portion and first background portion for later use if the customer does not request delivery of the second image portion and first background portion.

4. The kiosk of claim 1, wherein the first tag plate and second tag plate are different colors.

5. The kiosk of claim 1, further comprising a payment system configured to receive payment from a customer.

6. The kiosk of claim 1, wherein the cutting instrument is a laser-cutting apparatus.

7. The kiosk of claim 1, further comprising a storage receptacle configured to house tag plates prior to cutting.

8. The kiosk of claim 1, further comprising a plurality of backing plates.

9. The kiosk of claim 1, further comprising a database, wherein the database stores cutting-pattern templates and is operably connected to the graphical user interface such that said cutting-pattern templates are presented to the customer via the graphical user interface.

10. The kiosk of claim 9, wherein the database is configured such that a customer's cutting pattern selection input may be stored for future use.

11. The kiosk of claim 1, further comprising an external housing.

12. The kiosk of claim 11, wherein the housing has a vending slot configured to deliver the first image portion and second background portion.

* * * * *